Aug. 16, 1966     K. G. BRODIE     3,266,535
SAFETY BLADE CLAMPING MEANS FOR PORTABLE POWER SAWS
Filed June 1, 1964
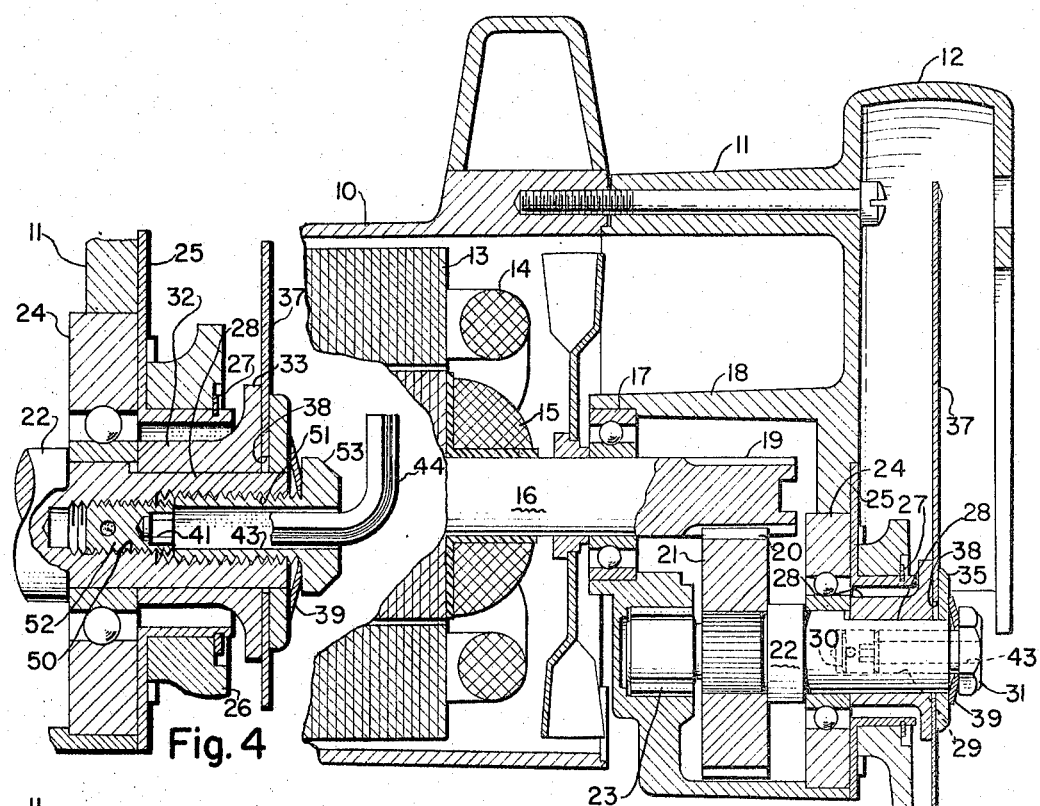
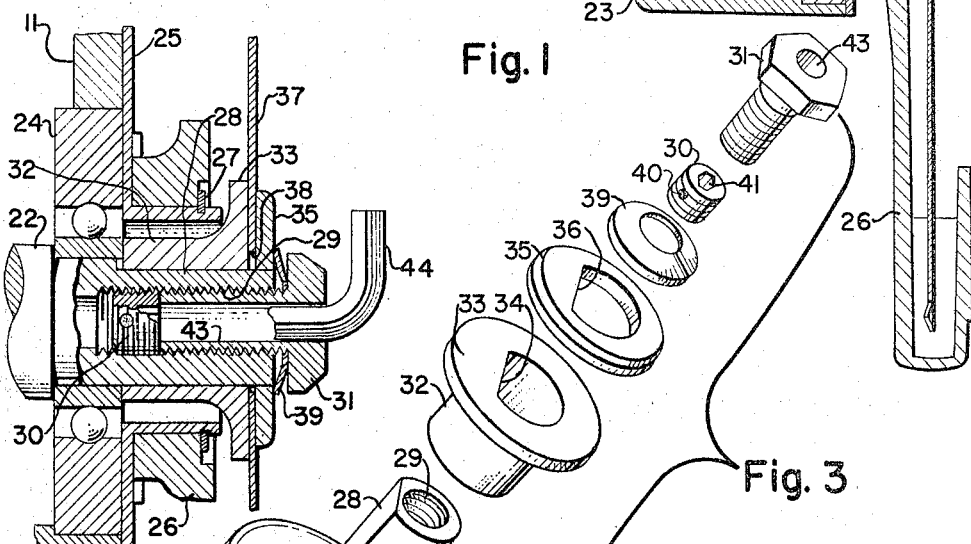
INVENTOR.
KENNETH G. BRODIE
BY
Marshall J. Breen
ATTORNEY form 3,266,535
SAFETY BLADE CLAMPING MEANS FOR PORTABLE POWER SAWS
Kenneth G. Brodie, Greenville, S.C., assignor to The Singer Company, New York, N.Y., a corporation of New Jersey
Filed June 1, 1964, Ser. No. 371,374
5 Claims. (Cl. 143—155)

The present invention relates to an adjustable resilient coupling means between the blade and the driven spindle of a portable power saw and more particularly to such means whereby the saw blade is decoupled from and allowed to slip on the spindle whenever the blade encounters sufficient resistance to further rotation, and without effecting any change in the torque setting due to said slippage.

It is generally agreed in the industry that it is necessary to have some sort of a slip clutch or torque-limiting coupling between the motor and the saw blade of power saws to prevent "kicking" of the saw out of the work which may be dangerous to the operator, to prevent motor burn outs due to stalled conditions and to prevent breaking of the driving gears due to torque overload.

Many ingenious devices have been developed for accomplishing the above desirable result and these range all the way from complicated and expensive slip clutches for decoupling the spindle from the motor to simple clamping of the saw blade between slip washers compressed by a clamping nut or screw secured on the spindle.

All of these prior art devices have, in varying degrees, been unreliable in operation in that the maximum torque setting does not remain constant but varies with the slippage occasioned by use. The general difficulty seems to be that the couplings tend to become tighter with use and ultimately become equivalent to a direct without slippage and capable of delivering the full motor torque to the saw blade, which latter condition of course amounts to failure of the device to provide its intended function.

In view of the foregoing it is a primary object of this invention to overcome the difficulties above set forth and particularly it is an object of this invention to provide a simple saw-blade mounting means which incorporates therein a torque-limiting slip coupling which may be closely adjusted to prevent "kicking," breakage of the saw parts and overloading of the motor. More specifically, it is an object of this invention to provide in a portable power saw, an adjustable torque-limiting slip coupling which, when once set, does not appreciably change its torque setting with continued use.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

FIG. 1 is a partial longitudinal sectional view taken through a power saw showing an embodiment of the present invention, FIG. 2 is a detailed sectional view taken through the spindle of the device of FIG. 1, FIG. 3 is an exploded perspective view of the device of FIG. 2, FIG. 4 is a detailed sectional view showing a modification of the structure of FIG. 2.

Referring now to FIG. 1, there is shown a portable power saw having a motor housing 10 and a gear housing 11 formed with a stationary guard portion 12. A motor stator 13, field winding 14 and armature 15 are contained within the housing 10. An armature shaft 16 is journaled in a bearing 17 and extends within a grease-containing compartment 18.

The free end of the armature shaft 16 is formed with splines 19 which mesh with teeth 20 of a gear 21 secured on a spindle 22 which is journaled at one end in a needle bearing 23 and at the other end in a ball bearing 24. A flanged collar 25 secured to the gear housing 11 retains the bearing 24 therein and provides a cylindrical bearing surface for a movable blade guard 26 retained thereon by a snap-ring 27.

The spindle 22, as seen best in FIG. 3, is formed with a terminal portion having a flat 28 and containing a blind axial bore 29 which is tapped to receive a set screw 30 and a headed clamping screw 31.

As seen in FIGS. 2 and 3, a spacer 32 having a flange portion 33 and a D-shaped central opening 34 is received on the matching flat portion 28 of the spindle 22 for rotation therewith. A washer 35 having a D-shaped central opening 36 is also received on the flat portion 28 and rotates with the spindle 22. A saw blade 37 having a central circular aperture 38 of larger diameter than that of the terminal portion of the spindle is held on said spindle in frictional clamped relation between the spacer 32 and the washer 35. It will be seen that, as the clamping screw 31 is turned to advance it into the axial bore 29 in the spindle 22, and after all lost motion is taken up, the spacer 32 seats against the inner race of the bearing 24 as a stop and further tightening of clamping screw 31 results in distortion of a spring washer 39 between the washer 35 and the head of the clamping screw 31 to transmit a resilient force which clamps the saw blade 37 frictionally between spacer 32 and washer 35. Since the spacer 32 and washer 35 must rotate with the spindle 22, the above arrangement constitutes a frictionally coupled torque transmission between the spinde 22 and the saw blade 37. Thus the clamping screw 31 may be adjusted to supply a frictional clamping force corresponding to any predetermined maximum torque to be transmitted, above which torque the saw blade 37 will slip relative to its clamping elements and thus relative to the spindle 22.

To insure that, when once set, the torque limit will not be exceeded due to continued use of the tool and which would, as above pointed out, be a dangerous condition, the set screw 30 serves as a positive bottoming stop for the clamping screw 31 preventing its further advance into the axial bore 29. The set screw 30 is preferably of the self-locking type provided with deformable inserts 40 and having a hex recess 41 in the head.

In order to adjust the screw 30, a hex wrench 44 is inserted through an axial bore 43 in the clamping screw 31 to engage the hex recess 41, as seen best in FIG. 2.

It will be noticed that, in the embodiment of FIG. 2, the clamping screw 31 and the set screw 30 have threads of the same pitch and diameter. It has been found that, with this arrangement, there is some tendency for the clamping screw 31, when turned, to transmit its turning moment to the set screw 30 and thus the stop position, supposedly fixed by the set screw 30, may be slightly upset.

To remedy the above condition, the modification shown in FIG. 4 may be used and this may be considered the preferred embodiment. The embodiment of FIG. 4 differs from that of FIG. 2 only in that the axial bore in the spindle 22 is counterbored to present two bores 50 and 51 of different diameter and tapped for threads of different pitch. A set screw 52 is threaded into the inner bore 50 and a clamping screw 53 is threaded into the outer bore. With this slight difference in structure the parts function in the same way as before but there is now no tendency for the tightening of the clamping screw 53 to upset the previously set stop position of the set screw 52.

It will be perceived from the above that there is provided according to this invention a simple blade clamping means for portable power saws incorporating a torque-limiting slip coupling between blade and spindle which may be set to slip on the attainment of a maximum torque transmission and which setting will be substantially unaffected by said slippage over an extended period of use.

What is claimed is:

1. In a power driven tool, the combination of a housing, a spindle journaled in said housing, said spindle having an externally accessible blind axial bore and a terminal portion presenting a non-circular cross section, first and second spacers formed with non-circular central openings and slidably received on said non-circular terminal portion of said spindle to rotate therewith, a saw blade free to turn on said spindle but held frictionally clamped between said spacers, a headed clamping screw having an axial bore and tapped into said spindle bore, a spring washer between the head of said clamping screw and one of said spacers, and means for adjustably limiting the axial movement of said clamping screw into the spindle bore including a set screw tapped into said spindle bore and externally accessible for adjustment through the axial bore in said clamping screw to form a bottoming stop for said clamping screw.

2. Structure in accordance with claim 1 wherein the spindle is counterbored to present coaxial bores of different diameters and tapped for different thread pitches, said set screw being tapped into one of said bores and said clamping screw being tapped into the other of said bores.

3. Blade clamping structure for a portable power saw having a housing, comprising a spindle journaled in said housing, said spindle having an external terminal portion formed with an axial bore, first and second spacers slidable on said terminal portion but fixed to rotate with said spindle, a saw blade positioned on said spindle between said spacers, means for adjustably applying a clamping force between said saw blade and said spacers to transmit torque between said spindle and said blade having a maximum value related to said clamping force, said means including a headed clamping screw having an axial bore and tapped into said spindle bore, a spring washer located between the head of said clamping screw and one of said spacers, and a set screw tapped into the spindle bore and externally accessible for adjustment through the axial bore in said clamping screw to form a bottoming stop for said clamping screw to limit its axial movement into the spindle bore.

4. Blade clamping structure for a portable power saw having a housing, comprising a spindle journaled in said housing, said spindle having an external terminal portion formed with two connecting coaxial bores of larger and smaller diameters, first and second spacers slidable on said terminal portion but fixed to rotate with said spindle, a saw blade positioned on said spindle between said spacers, means for adjustably applying a clamping force between said saw blade and said spacers to transmit torque between said spindle and said blade having a maximum value related to said clamping force, said means including a headed clamping screw having an axial bore and tapped into the spindle bore of larger diameter, a spring washer located between the head of said clamping screw and one of said spacers, and a set screw tapped into the spindle bore of smaller diameter and externally accessible for adjustment through the axial bore in said clamping screw to form a bottoming stop for said clamping screw to limit its axial movement into the spindle bore.

5. Blade clamping structure for a portable power saw having a housing, comprising a spindle journaled in said housing, said spindle having an external terminal portion formed with two connecting coaxial bores of larger and smaller diameters and tapped with threads of different pitch, first and second spacers mounted on said spindle terminal portion and fixed to rotate therewith, at least one of said spacers having capacity to slide relatively to said other spacer, means for adjustably applying a clamping force between said saw blade and said spacers to transmit torque between said spindle and said blade having a maximum value related to said clamping force, said means including a headed clamping screw threaded into the spindle bore of larger diameter, a spring washer located between the head of said clamping screw and one of said spacers, and a set screw threaded into the spindle bore of smaller diameter and adjustable in said bore to form a bottoming stop for said clamping screw to limit its axial movement into the spindle bore.

No references cited.

DONALD R. SCHRAN, *Primary Examiner.*